United States Patent [19]
Öhlin

[11] Patent Number: 5,454,452
[45] Date of Patent: Oct. 3, 1995

[54] ABSORBER ARRANGEMENT

[75] Inventor: Kenth Öhlin, Sollentuna, Sweden

[73] Assignee: Ohlins Racing AB, Sweden

[21] Appl. No.: 174,611

[22] Filed: Dec. 28, 1993

Related U.S. Application Data

[63] Continuation of Ser. No. 30,000, Mar. 11, 1993, abandoned, which is a continuation of Ser. No. 779,972, Oct. 21, 1991, abandoned, and a continuation-in-part of Ser. No. 569,235, Aug. 17, 1990, Pat. No. 5,090,525, which is a continuation of Ser. No. 498,473, Mar. 22, 1990, abandoned, which is a continuation of Ser. No. 313,713, Feb. 22, 1989, abandoned.

[30] Foreign Application Priority Data

Feb. 22, 1988 [SE] Sweden ............................. 8800602

[51] Int. Cl.$^6$ ........................ F16F 9/18; F16F 9/46; B60G 11/26
[52] U.S. Cl. .............. 188/299; 188/317; 188/322.15; 280/707
[58] Field of Search ................ 188/299, 319, 188/322.15, 279, 280, 282, 317; 251/30.02, 30.03, 30.05; 280/707, 714

[56] References Cited

U.S. PATENT DOCUMENTS

| | | | |
|---|---|---|---|
| 4,732,408 | 3/1988 | Öhlin | 188/299 X |
| 5,090,525 | 2/1992 | Öhlin | 188/319 |

FOREIGN PATENT DOCUMENTS

0330634  8/1989  European Pat. Off. .

Primary Examiner—Robert J. Oberleitner
Assistant Examiner—Peter M. Poon
Attorney, Agent, or Firm—Laff, Whitesel, Conte & Saret, Ltd.

[57] ABSTRACT

A shock absorber has an arrangement for bringing about different kinds of damping characteristics, in response to external controls and independently of how the piston speed varies. The shock absorber comprises a piston which works in a cylinder (2) and which has a passage between upper and lower sides (1a, 1b) of the piston. The changes in the damping characteristics are obtained by a restriction in a channel through which a shock absorber medium or fluid flows. A first valve element (7) exerts an influence on the restriction in response to a first pressure which is created by a pilot flow running between the upper and lower sides at the piston. The pilot flow is determined by a second valve element (8) which is controllable by electrical control signal. The first valve element (7) comprises a spring-loaded, pressure-operated slide, the instantaneous position of which is counterbalanced by the first pressure and a second pressure originating from the pressure differential existing between the upper and lower sides of the piston. The second valve element interacts with a proportional magnet which provides a setting of the first pressure that is independent of the variation in the piston speed.

13 Claims, 4 Drawing Sheets

ABSORBER ARRANGEMENT

This application is a continuation of application Ser. No. 08/030,000, filed Mar. 11, 1993 now abandoned which was a continuation of Ser. No. 07/779,972, filed Oct. 21, 1991, now abandoned, which is a continuation-in-part of U.S. Ser. No. 07/569,235, filed Aug. 17, 1990, now U.S. Pat. No. 5,090,525, which is a file wrapper continuation of U.S. Ser. No. 07/498,473, filed Mar. 22, 1990, now abandoned, which was a file wrapper continuation of U.S. Ser. No. 07/313,713, filed Feb. 22, 1989, now abandoned.

BACKGROUND OF THE INVENTION

1. Field of the Invention

The invention relates to shock absorbers and more particularly to arrangements for bringing about different kinds of damping characteristics in a shock absorber.

The damping characteristics are determined by controls, independently of variations in any parameter which seeks to change the set damping effects, in an undesirable manner. For example, such a parameter might be constituted by the shock absorber's piston speed, which causes a speed dependent variation. The shock absorber comprises a piston/piston rod working in a fluid medium in the cylinder of the shock absorber. Moreover, the shock absorber works with a servo function, in which a first valve element carries out a determination of the size of a restriction in a principal medium flow between the upper and lower sides of the piston depending on a first pressure produced by means of a pilot medium flow ("pilot flow") running between the upper and lower sides which is determinable with a second valve element that is controllable by the controls.

2. Prior Art Statement

A hydraulic amplifier arrangement is previously known in association with electronically controllable shock absorbers. A control of a restriction determines the damping effect which may be carried out with proportionately small control signals. Thus, a small mass can be used in the element for controlling the function, which means that the system can work with small inductances. Reference is made to patent application PCT/SE85/00120 (WO 85/04698), which relates to an arrangement which permits changes in the damping characteristic during one and the same piston stroke.

The known arrangements for such control require comparatively complicated control equipment, in the form of micro-computer equipment, for example, and the necessary software.

However, there is a requirement for applications in which the control function for the damping characteristics of the shock absorber can be simplified while maintaining high demands on the controllable damping function. It must be possible, for example, to obtain uniform damping effects within the entire adjustment range by the use of simple settings of a potentiometer, pressure in a suspension system, speed monitoring elements, injection pumps, etc. It should also be possible to carry out adjustments in a stepless manner, if it is so desired.

In another case it is desirable to be able by means of electronic control to vary the shock-absorbing capacity of the shock absorber. The variation shall in this case be capable of taking place at even high speed, which presupposes a high speed of data transmission from the control unit to the shock absorber, and accordingly the latter shall be capable, for example, of varying its shock-absorbing characteristic several times during one and the same piston stroke. The control unit may consist of a microcomputer, and the shock absorber can also operate with a feed back circuit, by a width parameter data (the position, speed and direction of movement, etc., of the piston) are fed back to the control unit to be utilized in its control of the shock absorber.

In addition, there is a requirement that it is possible to give the shock absorber a simple and reliable construction. It must not be possible, for example, for variations in existing parameters, such as the piston speed, to influence the set damping characteristic. It must also be possible for the arrangement to function with small controls and weak control signals, i.e. with an amplifier/servo function.

SUMMARY OF THE INVENTION

According to the invention, the problems stated above are solved by the functions which determine the damping characteristic working with two combined adjustment systems. One system is operated with the controls for the pilot flow. The other is a self-regulating system for the principal medium flow. In another embodiment a unique proportional magnet/solenoid is proposed by the invention.

The inventive arrangement has, among other things, a first valve element comprising a member, preferably in the form of a movable slide, the position of which is in every instance counterbalanced by a first pressure produced by means of the pilot flow. A second pressure is originated from the pressure difference existing between the upper and lower sides of the piston. A second valve element includes or interacts with a proportional magnet which influences (for example, holds constant) the first pressure independently of the variation in the parameters (piston speed, for example).

Preferably a movable member in the form of a spring-loaded pressure-operated slide is used. The force of the spring acts on the member/slide in the same direction as a first force, caused by the first pressure, acting on the member/slide. Thus, the member/slide is counterbalanced by a force, which is composed of the spring force and the first force, and by a second force on the member/slide which is caused by the second pressure.

In a preferred embodiment, the member/slide is exposed to the first and second pressures via its end surfaces and is provided with a lateral recess for conducting the principal medium flow in both directions. Preferably, the slide is provided with a channel which connects the pressure spaces for the first and second pressures and via which the pilot flow runs in the direction from the pressure space for the second pressure to the pressure space for the first pressure. The second valve element preferably works towards a seat in a passage between the pressure space for the first pressure and a further space which is connected via first and second check valves with the upper and lower sides of the piston. The space for the second pressure is connected with the upper and lower sides of the piston via third and fourth check valves. In this manner, a pilot flow running from the upper side of the piston to its lower side acts via the third check valve, the channel in the member/slide, the seat passage and the second check valve. The pilot flow from the lower side of the piston to its upper side is conducted via the fourth check valve, the channel in the member/slide, the seat passage and the first check valve.

An electric control signal is supplied to the proportional magnet to bring about an armature force, referred to herein as a "third force", in the armature of the proportional magnet. The third force is directed toward a fourth force which is caused by the pilot flow, counterbalanced by the first pressure. The second valve element is pressed at its valve seat towards the pilot flow in response to the armature force.

With the inventive arrangement, it is preferable for uniform damping effects to be obtained within the entire adjustment range, which can be large with regard to the piston speed parameter (which may be a range of 0.05–4.00 m/sec, for example). The control unit used for controlling the shock absorber can be comparatively simply constructed. Preferably, a stepless control is used within the adjustment range.

According to the invention, it is possible through what is proposed above to make precise adjustments to the pressure acting on the unit (membrane). In this way the counteracting force is proportional to the control signal, independently of, or dependently in a predetermined fashion on the position of the valve element. The control signal can thus be given a constant value for each shock-absorption setting, without the need to resort to any compensation of the control signal value dependent on the variation in an actual parameter. A certain control signal quantity (flow) preferably produces a certain difference in pressure corresponding to this quantity between the lower and upper sides of the piston, irrespective of the piston speed, that is to say the amplifier arrangement (hydraulic amplifier arrangement) used operates preferably in such a way as to maintain the pressure difference constant for every adjustment value (control signal value). In actual fact, it is possible to cause the force which actuates the unit (the membrane) to vary so that the self-regulating function of the proportional magnet dependent on the pressure is utilized for the purpose of modifying the shock-absorption characteristic (for example harder shock-absorption at a higher piston speed).

DESCRIPTION OF THE DRAWINGS

Reference is made to the attached drawings, in which.

DESCRIPTION OF PREFERRED EMBODIMENT

Figure 1:
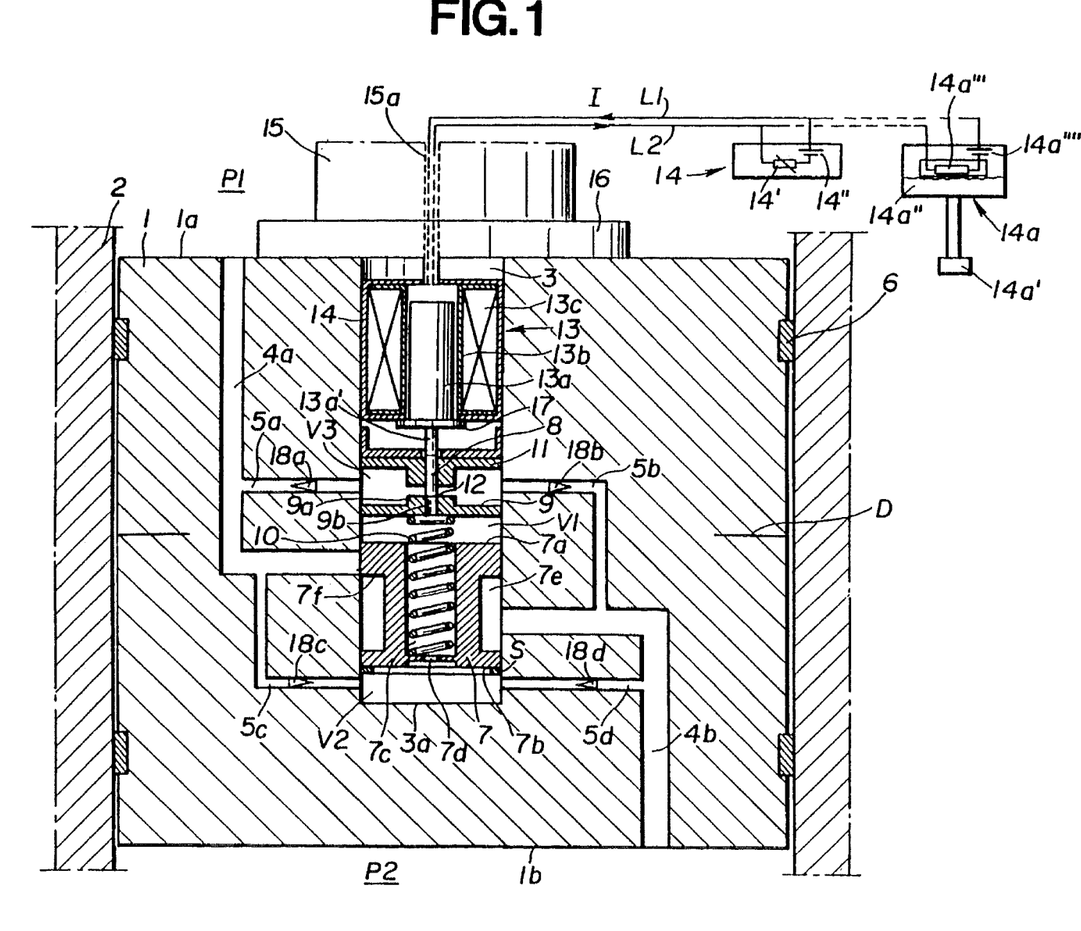
FIG. 1 shows in vertical section and in principle a piston provided with elements for controlling the damping characteristic.

The shock absorber can have a basic construction which is known per se, such as, for example, that described in the aforementioned PCT application. The piston and cylinder of the shock absorber are designated 1 and 2 respectively. The piston 1 is provided with an internal bore 3.

The piston works in a medium such as, for example, hydraulic oil or a similar fluid or emulsion of gas/fluid. The pressure on the upper side 1a of the piston has been designated P' and the pressure on the lower side 1b of the piston has been designated P". The piston is provided with channel sections 4a, 4b for a principal medium flow between the upper and lower sides. The piston is also provided with channel sections 5a, 5b, 5c, 5d for a pilot medium flow between the upper and lower sides. The channel sections 5a–5d are connected to the channel sections 4a, 4b, but may alternatively run directly into spaces at the upper and lower sides.

The piston is sealed against the cylinder wall with conventional sealing elements and in a known manner. The piston consists of two or more sections joined together via a dividing line D, at which the piston sections are joined together in any suitable and known manner, as with screws, adhesive, etc. For the sake of clarity, the channels are shown in a common plane; however, in the practical embodiment, they are located in different vertical sections in the piston. The dividing line has, therefore, not been drawn in full.

In the space 3, a first valve element 7 and a second valve element 8 are arranged. The first valve element 7 is in the form of a dynamically balanced, spring-loaded, pressure-operated slide, shown in its lower end position. The slide works between two spaces V1 and V2 which are varied as the slide moves. The lower end has an element for determining the end position. For example, a ring S is permanently fixed on the inner wall at the bottom of the piston. The space 3 is provided with a first fixed internal wall 9 which together with the slide end surface 7a delimits the space V1. The bottom 3a of the space 3, together with the slide end surface 7b delimits the space V2. The slide has an insertion hole 7c for receiving a spring 10 which is inserted between the bottom of the insertion hole 7c and the internal wall 9. The slide has an opening 7d connected to the insertion hole in order to obtain a connection/channel between the spaces V1, V2.

The slide 7 is provided with an annular lateral recess 7e for conducting the principal medium flow in both directions, between the upper and lower sides 1a and 1b of the piston. The slide 7 also has a first restriction/restricting edge 7f.

The second valve element 8 is mounted for longitudinal movement in a second fixed internal wall 11 in the space 3. The valve element works towards a seat 9a in the first fixed internal wall 9. The seat forms an integral part of a passage 9b in the wall 9. Via a second restriction 12 formed by the element 8 and the seat, the passage 9b connects the space V1 with a third space V3. The element 8 is in the form of a needle/pin (with 2–3 mm diameter, for example). Its end surface 8a has an area which is hereinafter referred to as the "needle area".

The valve element 8 forms an integral part of or interacts with a proportional magnet 13 which is in the space 3. The magnet includes an armature 13a, which is connected or interacts with the needle or pin 8. The interaction between armature and pin 8 takes place via a peg or contact part 13a' on the armature. The magnet includes a bobbin having a winding case 13b and a winding 13c.

The bobbin is surrounded by an iron cover 14 arranged to amplify the magnetic field which is produced by the proportional magnet when an electric signal I is supplied to the winding 13c. The control signal I is supplied via electrical conductors L1 and L2 which connect the windings to external control elements 14, 14a. The wires are arranged in a channel 15a inside the piston rod 15. The channel forms a gas tight connection in relation to the surroundings of the shock absorber. The piston rod is fixed in the piston in any suitable and known manner with a threaded fixing element 16. The transfer of wires between the movable piston and the fixed external connections for the wires L1 and L2 can be carried out in any suitable and known manner.

The mass of the needle and the armature is small. Thus, the proportional valve can work with small inductances, giving quick changes in response to the control signal, if so required. The armature 13a can be given a starting position defined by the stop 17, which position corresponds to the position according to FIG. 1. In this starting position the element has completely closed the seat 9a.

The control element 14, 14a can have a comparatively simple construction. With the control element 14, a setting can be carried out by means of a potentiometer 14' which can be manually operable, controlled from a speedometer, injection pump, etc. The control can be carried out in a stepless manner. With control element 14a, the control can be effected in response to a pressure, such as an air brake pressure, for example, delivered from a source 14a' which, via a bellows 14a", operates an element 14a'" which transforms pressure into an electric signal corresponding to the respective pressure value. The electricity supply can come from an electricity supply source, for example, a battery 14" or 14a"" respectively.

Check valves 18a, 18b, 18c and 18d are arranged in the pilot channel sections 5a, 5b, 5c and 5d, respectively. According to FIG. 2, the principal medium flow can be conducted in the direction of the arrows 19a, 19b, 19c to 19f from the upper surface 1a to the lower surface 1b of the piston. The passage leads via the channel section 4a, the restriction 7f, the recess 7e, and the channel section 4b. The principal medium flow can be conducted from the lower side 1b to the upper side 1a in the direction of the arrows 20, 20a, 20b to 20f, i.e. opposite to the direction given above.

Figure 2:
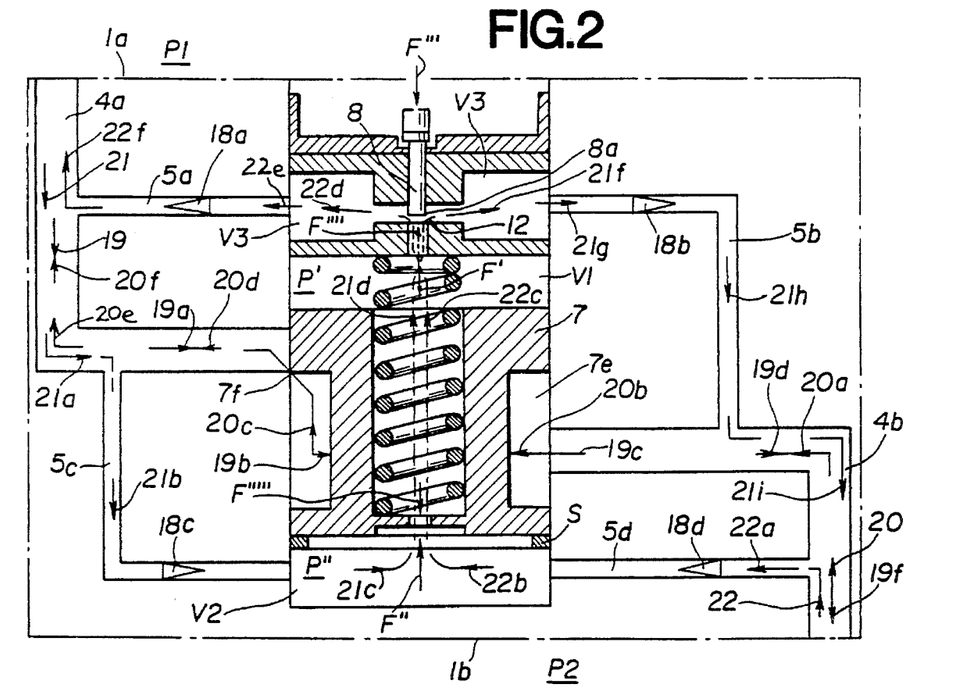
FIG. 2 is a vertical section showing parts of FIG. 1, where the acting medium flow paths and forces are given.

The pilot flows are conducted along different routes. When the pressure P1 is higher than the pressure P2, a first pilot flow is conducted in the direction of the arrows 21, 21a, 21b to 21d and 21f to 21i. In this case, the passage leads via the channel section 4a and into channel section 5c, via check valve 18c, the space V1, the thoroughfare in the slide 7, the restriction 12, the check valve 18b into the channel section 5b, and further out into the channel section 4b. In a case where the pressure P2 is greater than the pressure P1, a second pilot flow is formed in the direction of the arrows 22, 22a, 22b to 22f. In this case, the passage is via the channel section 4b and into the channel section 5d, the check valve 18d, the thoroughfare in the slide 7, the restriction 12, the space V3, the check valve 18a and into the channel section 5a and further out into the channel section 4a to the aforementioned upper side 1a.

In the space V1, there is a pressure P' which is defined by the valve element 8 and which gives rise to a force F' distributed along the end surface 7a. In the space V2, there is a pressure P" which is related to the pressure difference between the pressures P1 and P2 on the upper and lower sides of the piston. The pressure P" works towards the end surface 7b of the piston and produces a force F" which is distributed along the end surface 7b of the slide. The armature force in the proportional magnet is caused by the control signal indicated as F'". The respective pilot flow 21, 21a, 21b to 21i/22, 22a, 22b to 22f gives rise to a force F"" which is directed towards the force F'". The force F' combines with the spring force F""' and is directed towards the force F".

While the adjustment function is in progress, the pressure P' in the space V1 is determined by the ratio of the armature force F'"/area (needle area) of 8a. The proportional magnet provides an armature force determined by the set control signal I and furthermore allows its armature to be moved positionally, despite the control signal supplied. Thus, the element 8 can carry out longitudinal movements, toward or away from the seat 9a, depending on changes in the pressure P'. When the pressure tends to increase or decrease, the element can move in a direction away from or toward the seat 9a (FIG. 1), respectively, so that the pressure P' assumes a value at all times which corresponds to the control signal. Thus, the pilot flow is at all times counterbalanced by the pressure P' in the space V1. The element 8 (the armature) stands (or rides) on the pilot flow at the seat 9a and is pressed towards the pilot flow by the armature force.

The above described balance of forces means that a variation in a shock absorber parameter (the piston speed, for example) can be overcome so that it is prevented from having undesirable effects on the damping functions. The adjustment functions can be arranged so that the damping functions remain independent of the parameter in question, over the entire adjustment range. Or, alternatively, adjustments may be made dependent in a predetermined manner and within the adjustment range.

A changed control signal (i.e. another value of control signal I) gives rise to a corresponding change in the ratio armature force F'"/needle area. The pressure P' assumes a new value which corresponds to the change and which is then retained or changed in a predetermined manner within the entire adjustment range, independently of variations in the parameter in question, and so on.

The pressure P' is also utilized for the servo function carried out with the slide 7. The position of the slide 7 is defined by the pressures P' and P" pressure P' being settable in accordance with the pressure and P" being defined by the pressure difference then existing between the upper and lower sides of the piston (i.e. by P1-P2 or P2-P1). The restriction 7f of the principal flow is dependent upon the position of the slide which is defined by the aforementioned pressures P' and P".

A change in the piston speed, for example, results in tendencies to change the pressure difference between the upper and lower sides of the piston and thus to change the pressure P". The self-regulating function of the slide 7 causes the size of the restriction to be changed by means of a movement of the slide.

The change in the size of the restriction has an effect which counteracts the tendencies of the pressure difference to change between the upper and lower sides of the piston. The pressure P" is maintained at its assumed value. The movement of the slide in the regulating function for the principal flow causes tendencies to change in the set pressure P' within the space V1. The latter tendencies are, in turn, counteracted in the manner stated above and so on.

It is clear that the damping ability can be changed continuously in response to a varied control signal. The new arrangement can also work with rapid changes in the control signal. In trucks or lorries, for example, even in heavy ones, it may be appropriate to increase the degree of shock absorption with increased truck speed and vice versa. The shock absorber can thus be controlled by a speed monitoring element on the vehicle. The shock absorption ability can also be changed according to the load, for example, in buses and the like where control information can be sensed by an air-controlled suspension.

The new shock absorber can also be used with equipment other than vehicles, since the shock absorber can be used wherever vibrations of a mass are to be damped.

Figure 3:
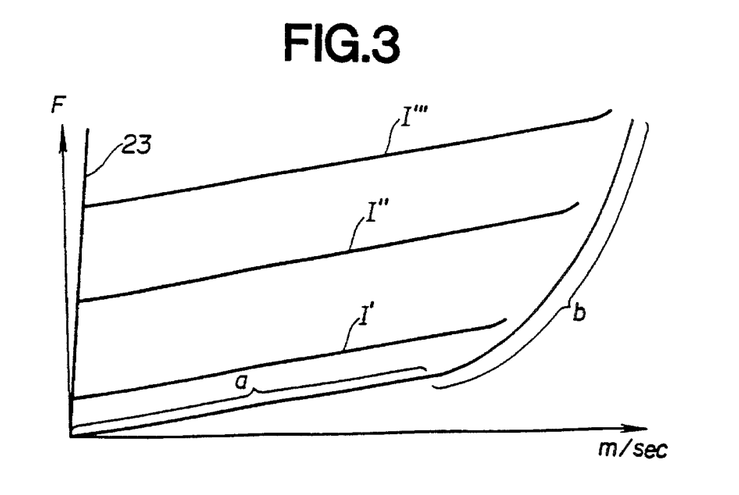
FIG. 3 shows in diagram form the force and piston speed curves for different sizes of the control signal within the adjustment range.

FIG. 3 exemplifies damping characteristics within the adjustment range of the shock absorber. The adjustment range is limited by a straight line 23 in the left section of the range. This line exists as a result of leakage between the piston and the cylinder. The angle between the vertical line for the force F and the limiting line 23 has been shown as exaggeratedly large for the sake of clarity.

At the bottom and toward the right, the adjustment range is limited by a limiting line which is similarly shown at an exaggerated large angle with regard to the X axis. This limiting line includes a straight section "a" and a curved section "b". The straight section "a" is defined by the C constant in the spring 10. Section "b" is defined by saturation in the valve function.

The graph lines or curves of FIG. 3 show an example in which the restrictions 7f and 12 are influenced. According to the invention, uniform damping characteristics are advantageously obtained within the adjustment range. The line I' is parallel to the limiting line "a" and shows the damping characteristics which are obtained for a current of approximately 200 mA. The curves I" and I''' correspond to control signals of 400 mA and 600 mA respectively.

The adjustment range can be kept large with regard to the piston speed variations despite the controllability of the shock absorber which the invention provides. The uniform damping characteristics of the shock absorber can, for example, be effective within a piston speed range as large as 0.05–4.00 m/sec.

Figure 4:
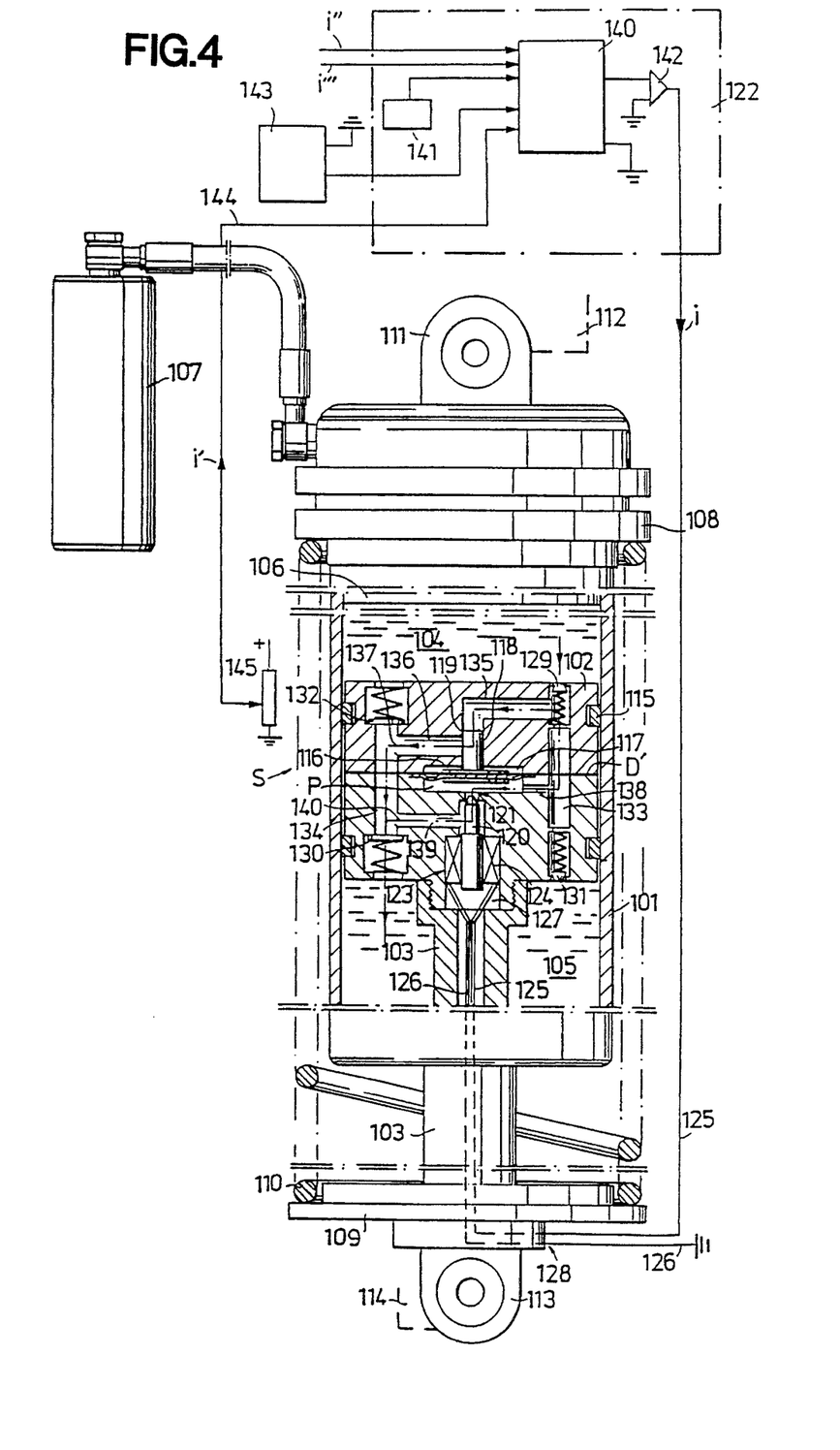
FIG. 4 shows in partially sectioned view a second embodiment of a shock absorber with an associated control unit of the microcomputer type.

The shock absorber S illustrated in FIG. 4 can have a basic construction of a previously disclosed nature, for example in accordance with the Öhlins "Gas-Shocks" shock absorber sold on the open market. This shock absorber comprises, among other things, a cylinder 101 and a piston device 102 with a piston rod 103. The piston device 102 works in a first fluid, preferably hydraulic oil, which is thus present at the upper and lower surfaces 104 and 105 of the piston. The shock absorber illustrated here is of the kind which also comprises a floating piston 106, which separates the first fluid from a second fluid, preferably a gas. The shock absorber S is capable of connection in a previously disclosed fashion to an accumulator 107 (gas accumulator) for the second fluid. The cylinder 101 and the piston 102 are each provided with its own seating 108 and 109 for a compression spring (coil spring) 110. The cylinder is provided with attachment devices for its attachment to a chassis or equivalent unit, and the piston rod 103 is provided with an attachment 113 for its attachment to a wheel or some other device, the movement of which requires to be damped relative to the unit 112. The seating 109 follows the movements of the piston rod.

The piston 102 is sealed against the internal wall of the cylinder by means of sealing devices 115 of a previously disclosed kind. The piston is executed with a parting line D', via which the two parts of the piston are capable of being joined together, for example by means of screws or adhesive, etc., (not shown here). The piston is executed with channels, via which a principal flow between the upper and lower sides 104 and 105 of the piston can be led. The piston is executed as a hydraulic amplifier arrangement, into which a pilot flow which moves alongside (parallel with) the principal flow between the upper and lower sides of the piston is capable of being led. The amplifier arrangement comprises a unit 116, which in the illustrative embodiment is executed as a membrane arranged inside a chamber 117. The unit 116 is connected to a first valve device 118, by means of which the unit 116 determines the size of a variable restriction (throttle valve) 119 for the principal flow. The aforementioned first valve device is connected to or associated with the first side of the unit. The second side of the unit 116 is capable of being exposed to a pressure P generated inside the chamber 117 at the aforementioned second side by means of the pilot flow. The aforementioned pressure acts against a retaining pressure exerted by the unit.

The size of the pilot flow is determined by a second valve element 120, which determines the size of a variable second restriction (throttle valve) 121 depending on electrical control signals i obtained from a control unit 122 described in more detail below. The valve element is part of a proportional magnet which is designated in its entirety in FIG. 1 by the designation 123 and comprises an electrical winding 124 with connecting wires 125 and 126, of which the first is connected to the control unit 122 and the second is earthed to the shock-absorber, or to the chassis or equivalent unit, etc. The valve element 120 has low mass, and the proportional magnet as a whole has small volume (5–10%) in relation to the total volume of the piston. The proportional magnet is arranged inside an internal space 127 in the piston and/or the piston rod. The later comprises an internal channel for the electrical wires 125, 126. The articulated outlet for the aforementioned electrical conductors is executed at the outlet 128 with lengths of wiring for the electrical conductors 125 and 126 such that movements of the shock absorber are permitted without damage to the wires. The proportional magnet 120 can be in the form of a previously disclosed unit.

For the purpose of producing the principal and pilot flows in both directions the piston is provided with two pairs of interacting check valve arrangements 129 and 130, and 131 and 132. The piston exhibits two parallel channel parts 133 and 134, at the ends of which the valve devices 129 and 131, and 130 and 132 are arranged. In a first transverse passageway 135, 136 between the channel parts 133 and 134 the principal flow 137 passes between the upper and lower sides of the piston via the restriction (throttle valve) 119. In a second transverse passageway 138, the chamber 117 and the transverse passageway 139, between the channel parts 133 and 134, the pilot flow 140 passes between the upper and lower sides of the piston via the restriction (throttle valve) 121. The valve devices 129 and 130 open for the principal and pilot flows when the pressure is higher on the upper side 104 compared with the pressure on the lower side 105. The check valves 131 and 132 are kept closed in this case. If, on the other hand, the pressure is higher on the lower side, the valves 131 and 132 are open, and the valves 129 and 130 closed.

The membrane 116 is clamped via its peripheral edge between the parts of the piston at the aforementioned parting line D'. The membrane divides the chamber 117 into two subsidiary chambers. The piston rod 103 is secured to the piston via an internal thread in conjunction with the space 127 for the proportional magnet 123.

The control unit 122 comprises a microcomputer 140 (for example, Motorola 6805) with input and output circuits 141 and a power adaptation unit (amplifier) 142, at the output from which the control signal i is obtained. An electrical energy supply unit (for example, a battery) is designated by 143. The control unit 122 and the shock absorber operate on the principle of the feedback 144 of one or more shock absorber parameters, for example the piston position, the direction of movement of the piston, and the piston speed, etc. The feedback function is capable of being effected with the help of sensors of a previously disclosed kind for detecting one or more parameters (pressure and movement, etc., can be detected), and is symbolized in FIG. 4 by a potentiometer 145. The signal from the sensors, or the feedback signal, is designated by i'. The control unit also produces its control signal depending on the incoming data i", i'" from data generating devices (not shown here) in the vehicle or equivalent unit.

Examples of data generating devices are the transmission and the accelerator linkage of the vehicle, and the speed and inclination of the vehicle, etc.

The microcomputer comprises, among other things, a CPU and its associated memories, for example ROM and RAM memories. The ROM memory contains a program which controls the shock absorber depending on the aforementioned external and feedback data. The ROM memory can also include stored constants which contain the data required by the program for the control functions in question. The RAM memory is used for the random storage of calculation variables. The data transmission speed can also be high (for example, 100,000 bits per second, or faster).

The pressure P inside the chamber 117 on one side of the device 116 is determined by means of the signal i generated by the control unit 22. A first value for the control signal (for example, 100 mA) corresponds to a pressure P of a first level, and thus to a first setting of the restriction (throttle valve) 119. A second value for the control signal i (for example, 200 mA) corresponds to a pressure P of a second level, and thus to a second setting of the restriction (throttle valve) 119, and so on. An external shock absorber parameter, for example the piston speed, may, however, result in the situation in which a parameter-dependent pressure difference will tend to be built up or to be reduced across the upper and lower surfaces of the piston, which pressure difference could influence the pilot flow and thus the level of the pressure P, which would no longer correspond to the value of the set control signal. The proportional magnet (solenoid) is accordingly executed with a self-regulating function through its valve element 120 being adjustable depending on the pressure P. By variation of the restriction (throttle valve) 121, the regulating function causes the pressure P to be maintained at a constant level or to vary in a predetermined fashion.

Figure 5:
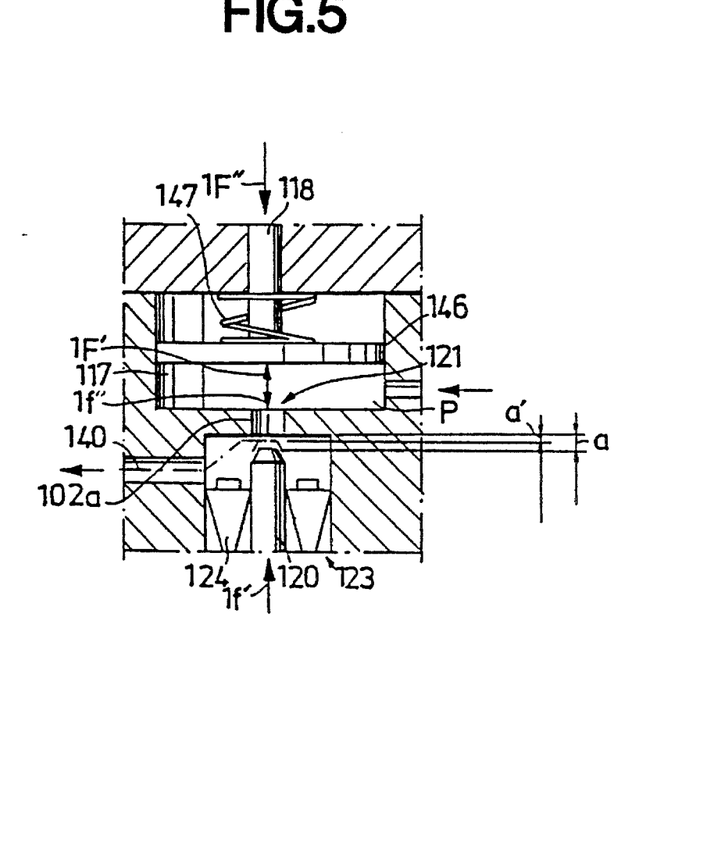
FIG. 5 shows in vertical section parts of a piston included in the shock absorber in accordance with FIG. 4.

FIG. 5 illustrates an alternative embodiment of the unit 116, which in this case has been replaced by a piston device 146 and a spring 147. The pressure P produces a force 1F' against the piston 146, of which the return force for the spring 147 is indicated by 1F". The control force for the valve element produced by the control signal i is indicated by 1f', whereas the counter-acting force on the valve element generated by the pressure P is indicated by 1f". The valve element 120 operates against a seat 102b, and with it forms the second restriction (throttle valve) 121. The pilot fluid flow thus passes the element 120 and gives rise to the aforementioned counter-acting force 1f" upon it. In an actual chronological phase the valve 123 activated by means of a control signal i, the present value of which is adjusted in the restriction (throttle valve) 121 to a value a, which corresponds to a given shock absorber capacity in the shock absorber. If the piston speed increases, the pressure difference across the piston 102 will increase, and the pressure P will increase. The valve element 120 in the magnet 123 is influenced by the change in the pressure (in the force 1f") and is displaced longitudinally to a distance a', resulting in the pressure P (the force 1f") falling, and so on.

Figure 6:
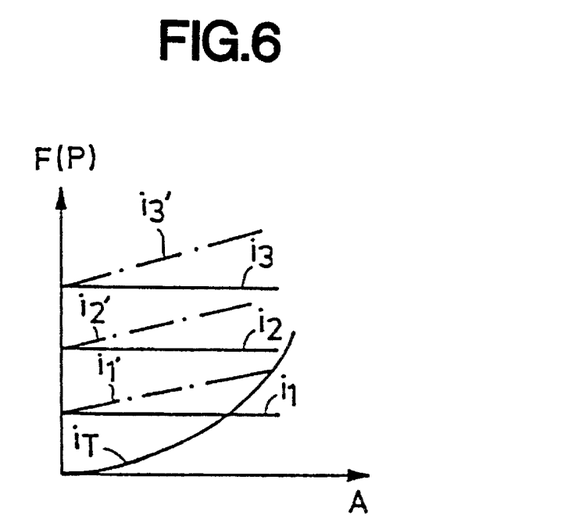
FIG. 6 shows in diagrammatic form the position of a valve element included in the shock absorber according to FIGS. 4 and 5, dependent on an actuating force or an actuating pressure, and at different values of the electrical control signal.

FIG. 6 shows the distance/force diagram for the various control signal levels $i_1$, $i_2$, $i_3$ in the form of solid horizontal lines. It can be seen from the solid curves that the valve element 120 produces a constant actuating force IF for the unit 112 (146) at each actuation level Dashed and dotted lines $i_1'$, $i_2'$ and $i_3'$, which illustrate the case when the self-regulating function of the magnet 123 can be utilized in order to vary the shock-absorption capacity depending on the actual external parameters (piston speed). The solid curve $i_T$ illustrates the distance/force diagram for conventional valves with one and the same positional adjustment for the valve element for one and the same flow $i_T$. A piston speed following a change in the setting of the valve element occurs here on the basis of a non-linearly increasing curve. In this case the longitudinal displacement depending on the piston speed must be varied by means of changes in the control signal, which causes difficulties due to manufacturing inaccuracies, etc., in the valve as such.

The invention is not limited to the embodiment given as an example above, but can be subjected to modifications within the scope of the following patent claims and the inventive concept.

What is claimed is:

1. A shock absorber arrangement for varying a shock-absorbing capacity in response to electrical control signals, said shock absorber comprising a piston having upper and lower sides, a first variable restriction for enabling a principal fluid flow with a pressure between the upper and lower sides of said piston, means for determining a size of the first variable restriction in response to said pressure acting on one side of the determining means, a second restriction, a pilot fluid flow between the upper and lower sides and via said second restriction, said acting pressure being generated by said pilot fluid flow, and control means operated by electrical control signals for actuating said second restriction in order to determine the size of the pilot fluid flow, the control means comprising a proportional magnet operated in response to said electrical control signals, a valve element which operates against a seat included in the second restriction, the position of the valve element being controlled by said proportional magnet in response to each of a plurality of said electrical control signals settings, said second restriction creating a force acting counter to the force which is determined by the electrical control signal operating the valve element, the counter-acting force being independent of the position of the valve element.

2. The shock absorber of claim 1 wherein said first variable restriction is taken from a group consisting of a membrane, and a spring-loaded piston.

3. A shock absorber arrangement for varying a shock-absorbing capacity in response to electrical control signals, said shock absorber comprising a piston having upper and lower sides, a first variable restriction for enabling a principal fluid flow with a pressure between the upper and lower sides of said piston, a pilot fluid flow path including a second restriction, said pilot flow path extending between the upper and lower sides via said second restriction, means responsive to said pilot fluid flow for determining a size of the first variable restriction in response to said pressure acting on one side of the determining means, and control means comprising a proportional magnet operated by the electrical control signals for actuating said second variable restriction in order to determine the size of the pilot fluid flow, the proportional magnet being operated by said control signals, a valve element controlled by said proportional magnet which operates against a seat included in the second restriction to produce a force which is acting counter to the force resulting from operation of the valve element in response to the electrical control signals, the position of the valve element being determined for each control signal setting by the counter-acting force in order to make the counter-acting force dependent in a predetermined manner upon the position of the valve element.

4. The shock absorber of either claim 1 or claim 3 and self-regulating means including the proportional magnet for transmitting said counter-acting force to provide an amplifier/servo pressure effect control over the shock-absorber for counteracting any increase in the difference in pressure between the upper and lower sides of said piston, which difference may occur due to a variation in a shock-absorber parameter.

5. The shock absorber of claim 4 wherein said parameter is an increase in a difference in pressures between the upper and lower sides of the piston responsive to a speed of movement of said piston.

6. The shock absorber of claim 4 wherein said parameter is a fluctuation in a fluid flow/damping of said piston.

7. The shock absorber of either claim 1 or claim 3 wherein there are at least three different levels of control signal values for maintaining said pressure at a constant level.

8. A shock absorber having a variable shock absorber capacity which is controlled in response to electrical control signals, said shock absorber comprising:

(a) a piston which works in a cylinder;

(b) a passageway communicating between upper and lower sides of the piston; and (c) means for bringing about different kinds of damping characteristics in response to electrical control signals and independent of variations of piston speed; said means including:

(c-1) a pilot flow path extending between the upper and lower sides of the piston;

(c-2) a restriction in said passageway, the size of said restriction defining the damping effects of the shock absorber;

(c-3) a first valve element for exerting an influence on the restriction in response to a first pressure which is created by a pilot flow in said pilot flow path;

(c-4) a second valve element for controlling the pilot flow in response to the electrical control signals; and (c-5) a proportional magnet associated with said second valve element, said proportional magnet being operated by said electrical control signals in order to set the first pressure independently of variations in the piston speed;

said first valve element comprising a spring-loaded, pressure-operated slide, which assumes instantaneous positions in response to a counterbalance of the first pressure and a second pressure originating from instantaneous pressure differentials existing between the upper and lower sides of the piston.

9. A hydraulic shock absorber comprising a cylinder having at least one piston sliding therein, a return spring on one side of said piston for normally urging said piston in a first direction within said cylinder, means for providing a principal hydraulic fluid flow between opposite sides of said piston as said piston moves within said cylinder, means for providing at least one pilot flow of said hydraulic fluid for indicating an instantaneous response of said piston within said cylinder, transducer means responsive to said pilot flow for adjusting a response characteristic of said piston as it slides within said cylinder, said transducer means comprising means for converting said pilot flow into an electrical control signal, and programmable electrical means operated by said control signal for making said adjusting of said characteristic.

10. The shock absorber of claim 9 wherein said transducer means further comprises an armature associated and moving with said piston, a winding energized by said control signal, said winding surrounding said armature for variably attracting said armature responsive to said control signal, and a variable orifice controlled by said armature for altering a flow of said hydraulic fluid.

11. The shock absorber of either claim 9 or claim 10 and a plurality of check valves in association with said pilot flow for controlling said flow and the electrical signal generated thereby.

12. The shock absorber of claim 11 wherein said programmable means is a microcomputer, means for feeding external signals to said microcomputer responsive to sensors associated with a vehicle carrying said shock absorber, and means responsive to said microcomputer for adjusting said electrical signal.

13. The shock absorber of claim 12 and wherein said sensors sense at least one item in a group consisting of a transmission operation, acceleration, speed, position, direction of movement, and inclination of said vehicle, and an electronic memory means for storing a program for controlling said shock absorber responsive to said at least one item taken from said group.

* * * * *